United States Patent
Stähle

(10) Patent No.: US 10,385,821 B2
(45) Date of Patent: Aug. 20, 2019

(54) WATER POWER PLANT HAVING A FREE-STANDING AXIS OF ROTATION

(71) Applicant: Kurt Stähle, Neuhausen-Steinegg (DE)

(72) Inventor: Kurt Stähle, Neuhausen-Steinegg (DE)

( * ) Notice: Subject to any disclaimer, the term of this patent is extended or adjusted under 35 U.S.C. 154(b) by 0 days.

(21) Appl. No.: 15/538,854

(22) PCT Filed: Apr. 26, 2016

(86) PCT No.: PCT/EP2016/059263
§ 371 (c)(1),
(2) Date: Jun. 22, 2017

(87) PCT Pub. No.: WO2016/174017
PCT Pub. Date: Nov. 3, 2016

(65) Prior Publication Data
US 2018/0010573 A1    Jan. 11, 2018

(30) Foreign Application Priority Data

Apr. 27, 2015  (WO) .................. PCT/EP2015/000864
May 28, 2015  (DE) ...................... 20 2015 003 882 U

(51) Int. Cl.
*F03B 3/04*    (2006.01)
*F03B 3/12*    (2006.01)
(Continued)

(52) U.S. Cl.
CPC .............. *F03B 17/061* (2013.01); *F03B 3/04* (2013.01); *F03B 3/126* (2013.01); *F03B 3/18* (2013.01);
(Continued)

(58) Field of Classification Search
CPC .......... F03B 17/061; F03B 3/04; F03B 3/126; F03B 3/18; F03B 13/10; F03B 13/264; H02K 7/1823; Y02E 10/223; Y02E 10/28
(Continued)

(56) References Cited

U.S. PATENT DOCUMENTS 8,308,422 B2 * 11/2012 Williams ................ F03B 3/126
  415/7
8,466,595 B2 *  6/2013 Spooner ................ F03B 13/083
  290/54
(Continued)

FOREIGN PATENT DOCUMENTS

CA    2 352 673 A1    1/2003
EP    2 241 749 A1    10/2010
(Continued)

OTHER PUBLICATIONS

International Search Report (PCT/ISA/210) issued in PCT/EP2016/059263, dated Sep. 16, 2016.

*Primary Examiner* — Charles Reid, Jr.
(74) *Attorney, Agent, or Firm* — Birch, Stewart, Kolasch & Birch, LLP

(57) ABSTRACT

A water power plant for the generation of electric current from includes a housing around which a flowing medium passes on an outer side, a stator of an electric generator and a rotor of the generator, which is rotatably mounted relative to the stator. The rotor includes a rotor ring with an annular surface and an arrangement of inwardly extending turbine blades, thereby defining a free-standing axis of rotation. The housing defines an inlet portion with a first front-side cutting edge which delimits a circular inlet opening, from which extends an inlet-side guide surface to the rotor, and an outlet portion with an outlet opening, between which a flow path passing the rotor ring can be formed. It is provided that the inlet opening has a free inlet cross-section which is maximally as large as a cross-sectional area delimited by the rotor ring.

15 Claims, 11 Drawing Sheets

Figure 1:
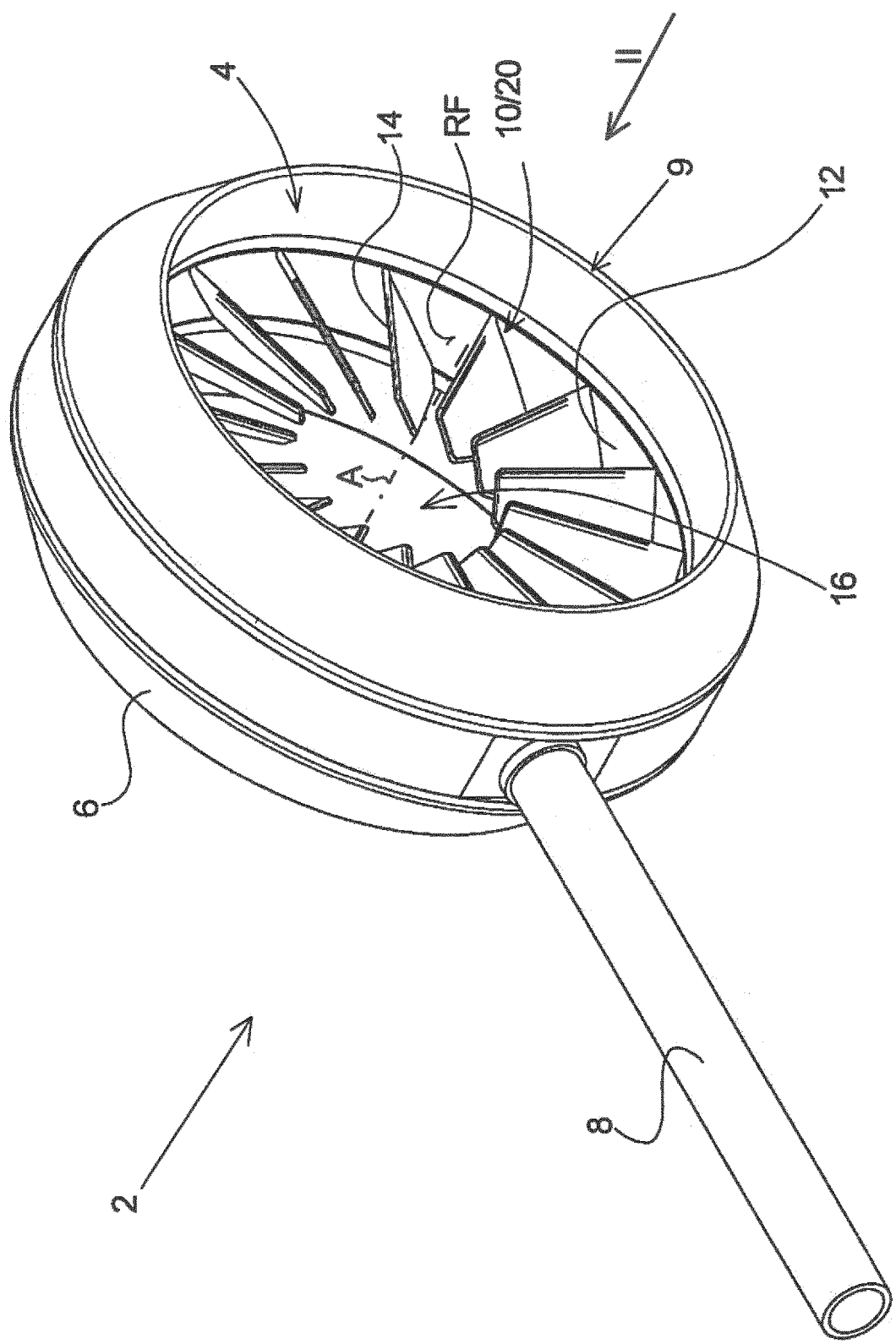

(51) Int. Cl.
    *F03B 3/18* (2006.01)
    *H02K 7/18* (2006.01)
    *F03B 13/10* (2006.01)
    *F03B 13/26* (2006.01)
    *F03B 17/06* (2006.01)

(52) U.S. Cl.
    CPC ............ *F03B 13/10* (2013.01); *F03B 13/264* (2013.01); *H02K 7/1823* (2013.01); *Y02E 10/223* (2013.01); *Y02E 10/28* (2013.01)

(58) Field of Classification Search
    USPC ..................................................... 290/54, 43
    See application file for complete search history.

(56) References Cited

U.S. PATENT DOCUMENTS

| | | | |
|---|---|---|---|
| 8,596,964 B2* | 12/2013 | Ives | F03B 3/126 415/121.2 |
| 8,657,572 B2* | 2/2014 | Presz, Jr. | F03D 1/04 415/227 |
| 8,659,180 B2* | 2/2014 | Earl | E02B 9/08 290/54 |
| 8,754,540 B2* | 6/2014 | Ives | F03B 13/10 290/42 |
| 8,872,371 B2* | 10/2014 | Ives | F03B 13/264 290/42 |
| 2007/0018459 A1 | 1/2007 | Williams | |
| 2009/0278357 A1* | 11/2009 | Williams | F03B 13/10 290/53 |
| 2010/0232885 A1* | 9/2010 | Ives | E02D 15/08 405/204 |

FOREIGN PATENT DOCUMENTS

| | | |
|---|---|---|
| EP | 2 568 161 A1 | 3/2013 |
| WO | WO 2008/081187 A2 | 7/2008 |
| WO | WO 2009/153124 A2 | 12/2009 |

\* cited by examiner

WATER POWER PLANT HAVING A FREE-STANDING AXIS OF ROTATION

The invention relates to a water power plant for the generation of electric power from a flowing medium, as well as a water power installation with such a water power plant. The water power plant in this case has a turbine with housing on an outer side of which medium can flow around. Provided in the housing is a stator of an electric generator that can be designed both separately from the housing and as a single part with the housing. Furthermore, the turbine has a rotor rotatably mounted relative to the stator that together with the stator forms an electric generator that operates as a low-speed rotor. In said case, the rotor features a rotor ring with an annular surface and an arrangement of blade-like or blade-shaped turbine blades extending inwards from the rotor ring, wherein said blades extend inwards from the rotor ring. The rotor defines an axis of rotation that is free. In said case, the housing forms an inlet portion with a first front-side cutting edge that delimits a circular inlet opening. An inlet-side guide surface extends from this first front-side cutting edge towards the rotor. Moreover, the housing forms an outlet portion with an outlet opening, wherein a flow path passing through the rotor ring can be formed between the circular inlet opening and the outlet opening.

CA 2352673 A1 discloses a power plant with an electric generator that features an annular stator and a rotor rotatably mounted relative to the former. The rotor features a plurality of rotor blades that are located inwards from a rotor ring supported circumferentially, wherein the rotor defines a freestanding rotational axis. The electric generator is also connected to a tube that is directed at the rotor blades. In this way, the rotor can be moved by means of water flowing through the tube into a rotational motion relative to the stator in order to generate electric power.

Due to the circumferential support of the rotor, the disclosed power plant can be integrated particularly easily in a pipeline system with a fluid flowing therein in order to convert its flow energy into electric energy or electric power.

A disadvantage of this disclosed electric generator is that it can only be used in conjunction with a suitable pipeline system.

WO 2008/081187 A2 discloses a tidal power plant that is located at the bottom of a tidal stream or on a platform floating on the body of water. In the said case, the power plant features a plurality of turbines, the housing of which is designed in such a way that it can self-align against the respective flow direction of the tidal water. For this purpose, in all the embodiments provided, the housing forms a flow path that tapers from a circular inlet opening at least in portions in order to generate a sufficiently high static pressure for the alignment.

A disadvantage of the known water power plant is that relatively strong swirls occur during operation and a relatively high flow pressure acts on the turbines in overall. As a result, the water power plant requires a very complex and permanently stable anchoring of the turbines.

EP 2 568 161 A1 describes an apparatus for obtaining electric energy from hydropower, such as, in particular, from tidal flows. This features a tubular housing part in which a plurality of rotor blades is rotatable. In order to increase the flow velocity of the water flowing through the apparatus, an inlet funnel is provided on the housing.

EP 2 241 749 A1 describes a tidal force turbine with a tubular housing in which a rotor is arranged with several rotor blades projecting inward from a rotor ring. At the inlet of the housing, a profile is provided that constricts the flow path in the flow direction.

US 2007/0018459 A1 shows a water power plant with a rotor that is disposed in housing that is formed on both front sides by a flange. This each forms a circular opening, through which the apparatus is perfused. In said case, the flow drives a plurality of rotor blades that extend inwards from a rotor ring, a freestanding axis of rotation being defined.

The object of the invention is to provide a water power plant that makes possible a versatile, simple and preferably mobile application. In said case, the circular inlet opening features a free inlet cross-section that is at most as large as a cross-sectional area bounded by the rotor ring. This ensures that the flow of the inflowing medium occurring at the circular inlet opening during operation is at least not substantially greater than the flow in the area of the rotor. Consequently, both the flow pressure acting on the turbine and the occurrence of swirls in the flow path can be minimised. This, in turn, makes possible to achieve high efficiency of the turbine, ease of handling and attachment of the water power plant to a flowing medium. This makes it possible to immerse the water power plant into a flowing body of water, for example, into a natural stream or a channel above its surface, and to fix it with little effort in order to use it as a flow power plant. In said case, the turbine blades are subjected to a flow pressure, by means of which torque is generated on the rotor, which causes the latter to rotate relative to the stator. Due to the rotational movement of the rotor relative to the stator, which together acts as an electric generator, the motion energy of flowing water can be converted into electric power. The electric generator operates as a low-speed rotor, since the speed of movement of the rotor essentially corresponds to the flow rate of the water flowing through the turbine. The low flow pressure, the uniform flow through the flow path and the relatively low rotational speed of the rotor in combination with its free rotational axis result in a particularly high environmental compatibility of the water power plant. In said case, it is possible, for example, for fish to pass through the turbine without injury. In this way, the water power plant can be operated in natural waterways without causing significant disturbance. Due to the simple construction and the simple positioning of the turbine by merely dipping it inside the relevant flowing water, the water power station can also be used in a very versatile manner and, in particular, independently of pipelines or weir constructions. In this way, mobile use in the recreation area or for rescue operations is made possible in particular. To be able to construct the water power station with as less mass as possible, the water power plant, apart from the elements required for the generation of electricity, can essentially be made of plastic and/or aluminium components.

In a particularly advantageous embodiment, the free inlet cross-section of the circular inlet opening is maximally as large as the cross-sectional area limited by the rotor ring a minus material cross-sectional area of the turbine blades. In this way, the size of the free cross-sectional area of the circular inlet opening corresponds essentially to the size of the resulting free cross-sectional area of the perfused rotor, whereby a particularly uniform and turbulence-free flow can be achieved along the flow path through the turbine.

In addition, it is advantageous if the outlet portion features a second front-side cutting edge that delimits a circular outlet opening from which an outlet-side guide surface extends to the rotor and the free inlet cross-section of the circular inlet opening is maximally as large as a free outlet cross-section of the outlet opening. By means of this two-sided formation of a front-side cutting edge the flow body of the medium entering the flow path of the turbine can be separated from the remaining medium at the circular inlet opening and fed back again to the remaining medium at the outlet opening in a particularly turbulence-free manner. In addition, the maximum size of the free inlet cross-section provided here, as compared to the outlet cross-section, ensures that the flow is at most equal to the outflow of the medium at the outlet opening when the medium enters the circular inlet opening. As a result, a particularly uniform and swirl-free flow can be established over the entire length of the flow path through the turbine so that the static pressure occurring at the turbine can be reduced to a minimum.

Advantageously, the outer side of the housing features a convex contour between the circular inlet opening and the outlet opening. In this way, is possible to flow around the outside circumference with relatively low resistance. At the same time, the cross-section of the housing in this way forms sufficient space on its inner side in order to receive parts of the electric generator such as the stator or magnet-spring generating means of the rotor such that they are shielded against the surrounding water or against the flow pressure generated by the latter. Advantageously, the housing is arched on the outer side that is, smoothly shaped. In this way, the flow resistance occurring during operation on the housing can be minimized; in particular, the formation of vortices can be avoided by the circumferential smooth curvature. In this way, a cW value that is not more than 0.4, in particular a maximum of 0.3 can be achieved for the housing so that the flow resistance of the housing is particularly low relative to the respective surrounding water.

In addition, it is convenient if the at least one front-side cutting edge forms a radius as small as possible but still large enough to exclude cut-off injuries during assembly or handling of the housing as a function of the selected material radius of 5 mm. In said case, it is convenient if the housing is made, for example, of plastic, resulting in the cutting edge being able to be produced with a particularly small radius. In addition, the housing can be produced of plastic with a particularly low dead weight, which in overall increases the mobility of the water power plant. Due to the smallest possible radius of the front-side cutting edge, the static pressure occurring during operation at the upstream end of the housing can be minimised. Due to the additional formation of the cutting edge on the downstream face side, a convenient flow tearing off from the housing at the end of the flow around the outside can also be achieved.

Moreover, it is convenient if turbine blades feature an angle of incidence that is limited to a value at which no significant turbulences occur with regard to the flow rates of the medium intended for the operation of the water power plant, in particular, in conventional river streams. As a result, the water power station can be used in a particularly natural manner.

Advantageously, an annular gap is formed between the rotor ring and the inlet portion, as well as between the rotor ring and the outlet portion, a coil cavity of the turbine being sealed completely or at least substantially to the outside through these two annular gaps. This can prevent deterioration of power generation or a damage of the magnetic field generating means of the turbine by penetrating water and corrosion. It is convenient if a lip seal is provided on the annular gap. For this purpose, at least one closed sealing ring can be held in an annular groove that is let in on the rotor and/or on the stator or housing. As a result, a particularly reliable sealing of the coil cavity to the outside can be achieved. Alternatively or additionally, a labyrinth seal can be provided on the annular gap. The labyrinth seal allows a particularly long-lasting sealing of the annular gap. In this case, the relative rotational movement of the rotor can additionally be used to build up a flow resistance at the intermeshing parts of the labyrinth seal. In this way, an approximately complete sealing of the annular gap can be achieved by means of which the amount of water penetrating into the coil cavity can be reduced to a negligible extent.

In an alternative embodiment of the invention, lubricant-free support means and a seal-free annular gap can be formed between the rotor ring and the inlet portion as well as between the rotor ring and the outlet portion. The lubricant-free support means can be produced, for example, from plastic and/or ceramics. In this way, the turbine can also be operated without a sealing means between the rotor and the stator, resulting in the water power plant being able to be operated without any maintenance over longer operating periods. In addition, the at least predominantly plastic-made support means allow a particularly light design of the turbine.

As an alternative or in addition to this, the coil cavity can be subjected to an overpressure in a further advantageous embodiment of the water power plant, to be able to prevent completely the ingress of water into the coil cavity. For this purpose, the coil cavity, for example, can be connected via a pressure line to a compressed air source. In this way, the overpressure in the coil cavity can be provided particularly easily and cost-effectively.

An anti-adhesive coating is also provided advantageously on the annular gap. The anti-adhesive coating can be provided, for example, on adjacent surfaces of the rotor on the one hand and the stator or on the housing on the other hand, between one of these parts and the lip seal, between two sealing rings of the lip seal or between parts of the labyrinth seal moved relative to one another. In any case, the anti-adhesive coating can achieve a lower frictional resistance and thus a higher efficiency as well as low level of wear.

The turbine also advantageously features magnetic field generating means that are at least partially sealed with epoxy resin. As a result, the magnetic-field generating means, such as coils or permanent magnets, can be protected effectively and permanently against corrosion damage, for example, caused by entering water.

In an advantageous embodiment, the rotor is rotatable relative to the stator in both rotational directions, and at least the outer side of the housing is axis-symmetric in design, wherein the turbine can be operated in two directions. In this way, faulty positioning of the water power plant can be prevented when the turbine is immersed in the relevant flowing water.

Moreover, it is favourable if the turbine delimits an internal flow diameter of at least 30 cm. Thus, by means of the turbine also with a free passage opening, that allows passage of relatively large fish, in the case of conventional free-flowing streams, sufficient power generation and thus an economical operation can be ensured.

Preferably, a free passage opening is provided on the axis of rotation that features a diameter of at least 10 cm. As a result, fish with a maximum size that is customary for natural waterways can easily pass through the passage opening of the turbine. Consequently, the effects on the environment caused by the application of the water turbine in natural waters can be reduced to a minimum.

Moreover, it is advantageous if the housing is mounted on a support apparatus with a rigid, in particular tubular support element that forms a free mounting cross-section. By way of the rigid support element, the turbine can be immersed and fixed over the surface of the respective water body, wherein at the same time all the lines required for operation of the turbine can be routed comfortably and protected within the support apparatus.

An electrical line connected to the stator is advantageously accommodated in the free mounting cross-section. As a result, the electric power generated by the electric generator can be conducted comfortably and safely from the immersed turbine to the surface via the electrical line laid protected in the support apparatus.

In said case, it is also advantageous if the pressure line connected to the coil cavity is accommodated in the free mounting cross-section. In this way, the compressed air line required to generate the overpressure in the coil cavity can also be laid comfortably and protected to the turbine from a land-based compressed air source.

In a further advantageous embodiment, in addition to the support apparatus, the housing features a support spur that serves for anchoring the turbine in or on a water base. At least one support spur thereby, for example, protrudes on one side of the housing facing away from the support element, so that the turbine can be supported also on the water base when the turbine is immersed in water, thus enabling a more stable positioning of the water power plant.

Moreover, the above-mentioned object is achieved by a water power installation with at least one water power system in one of the above-mentioned embodiments, in which the housing is immersed in a flowing body of water, such as a natural water body or an artificial canal and that by means of the support apparatus is connected with a fixation that is positioned offshore. Said fixation allowing a position-stable attachment of the water power installation alongside respective flowing water. If a sufficient depth of water exists, such a water power installation can be used as a mini power plant for generating electric energy at virtually any location. In addition, such a water power installation by means of the simple and compact construction and the particularly comfortable positioning and commissioning of the turbine by merely immersing it into a flowing water body, it can be used for a network-independent provision of electric power also as a mobile or temporary water power installation. In said case, it can be fixed, for example, by anchoring it to the ground, on a support of sufficient weight placed on a foundation, or by fastening means for attaching it to an existing component/building or a tree. In this way, very quick construction of the water power installation is possible, which in turn makes a particularly cost-effective, flexible and, for example, mobile use possible.

In addition, it is favourable if fixing is arranged at a horizontal level that is above the turbine. Fixing of the support apparatus can thereby be provided above the water level of the waterway in question, for example, at a level that is secure from flooding in the bank area or on an artificial shore attachment, such as a dyke or a shore wall. As a result, the fixing elements and in particular electrical devices of the water power installation, which are used for distributing the electric power generated, can be protected effectively against contact with water, for example, resulting from floods.

Moreover, it is advantageous if a pivoted and/or swivel joint is provided between the fixing element and the support apparatus. As a result, with the remaining fixing element, the turbine held on the support apparatus can be swiveled and/or tilted on land to make it more accessible. In this way, for example, maintenance, repair or cleaning work can be carried out particularly comfortably.

In an alternative embodiment, the water power installation is mounted on a watercraft such as a sports boat. In order to enable the water power plant to be positioned in the respective water body only as required or to be easily stowed on board the watercraft, also in this water power installation, the housing can also be mounted between the support apparatus and the fixing element on the watercraft via a pivot and/or pivot support. As a result, the water power plant can be displaced from the water on board the watercraft and vice versa. The electric power generated by the hydroelectric installation can be used, for example, to charge at least an electrochemical energy storage device, in particular, in the stationary state of the watercraft in a flowing body of water or even during the trip. As electrochemical energy storage devices, rechargeable storage systems can be provided, for example battery/accumulator systems or super capacitors.

In a particularly advantageous embodiment, a flow-through protective arrangement is provided that is arranged upstream of the rotor with respect to a given flow direction. The protective arrangement that can be perfused in said case can be located independently of the water power plant in the respectively provided position in the water, thus by its own fastening means, for example, on its own foundation. As an alternative to this, the protective arrangement can also be located on the housing, for example, to permit an easy and quick use of the water power installation. In any case, the protective arrangement, for example, can feature a grid structure or an arrangement of parallel rods. The turbine and, in particular, the rotor can be protected against damage by propellant or suspended material.

In said case, it is particularly favourable if the perfused protective arrangement features an arrangement of parallel rods that are essentially horizontally and obliquely placed compared to the rotor. Due to the orientation at an angle to the rotor or to the flow direction of the relevant body of water, floated propellant or suspended material can be deflected around the turbine without remaining on the protective arrangement. In this way, the turbine and, in particular, the rotor can be protected from damage as well as from impurities caused by propellant or suspended material over an extended period.

Figure 2:
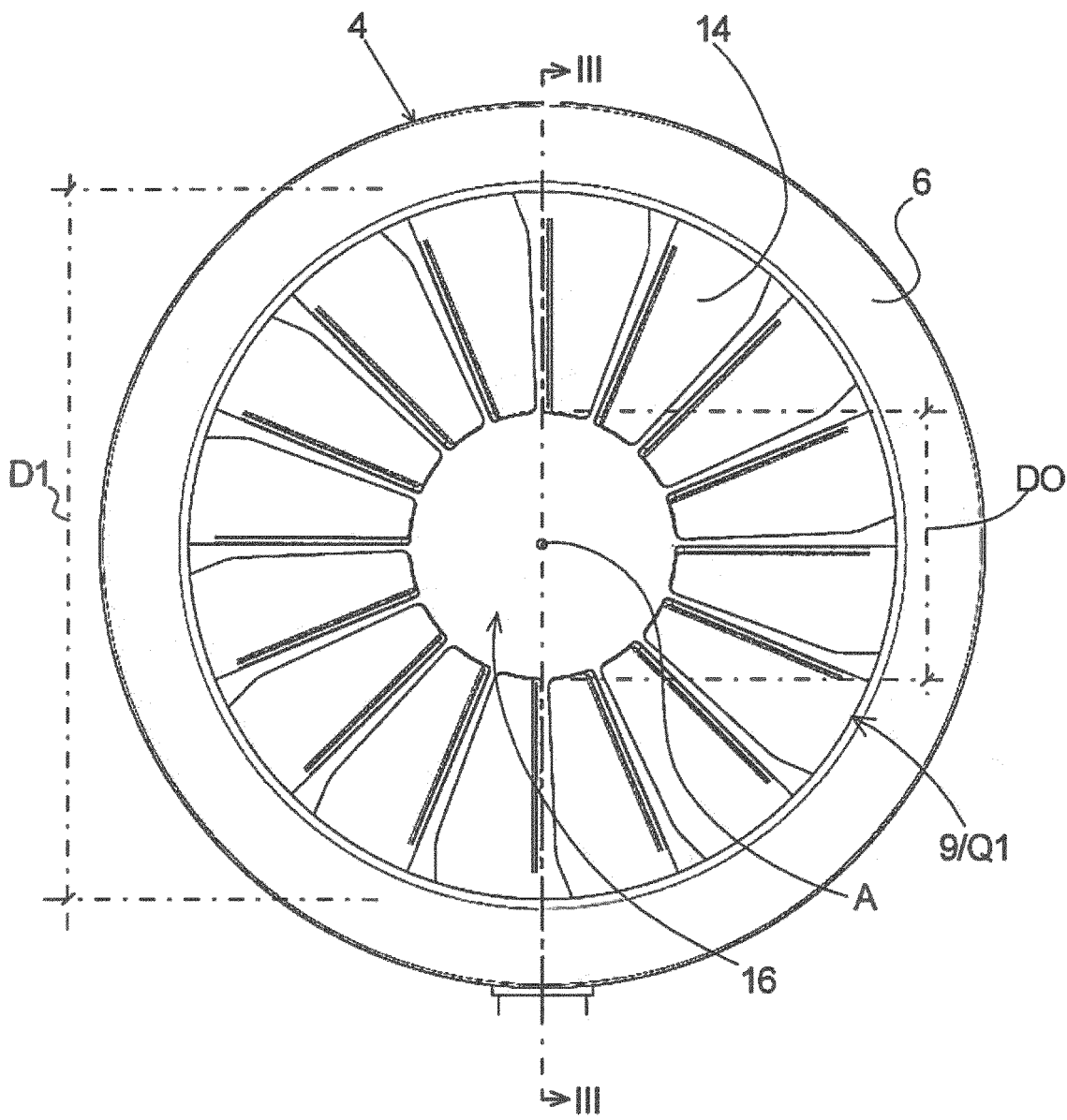
Figure 3:
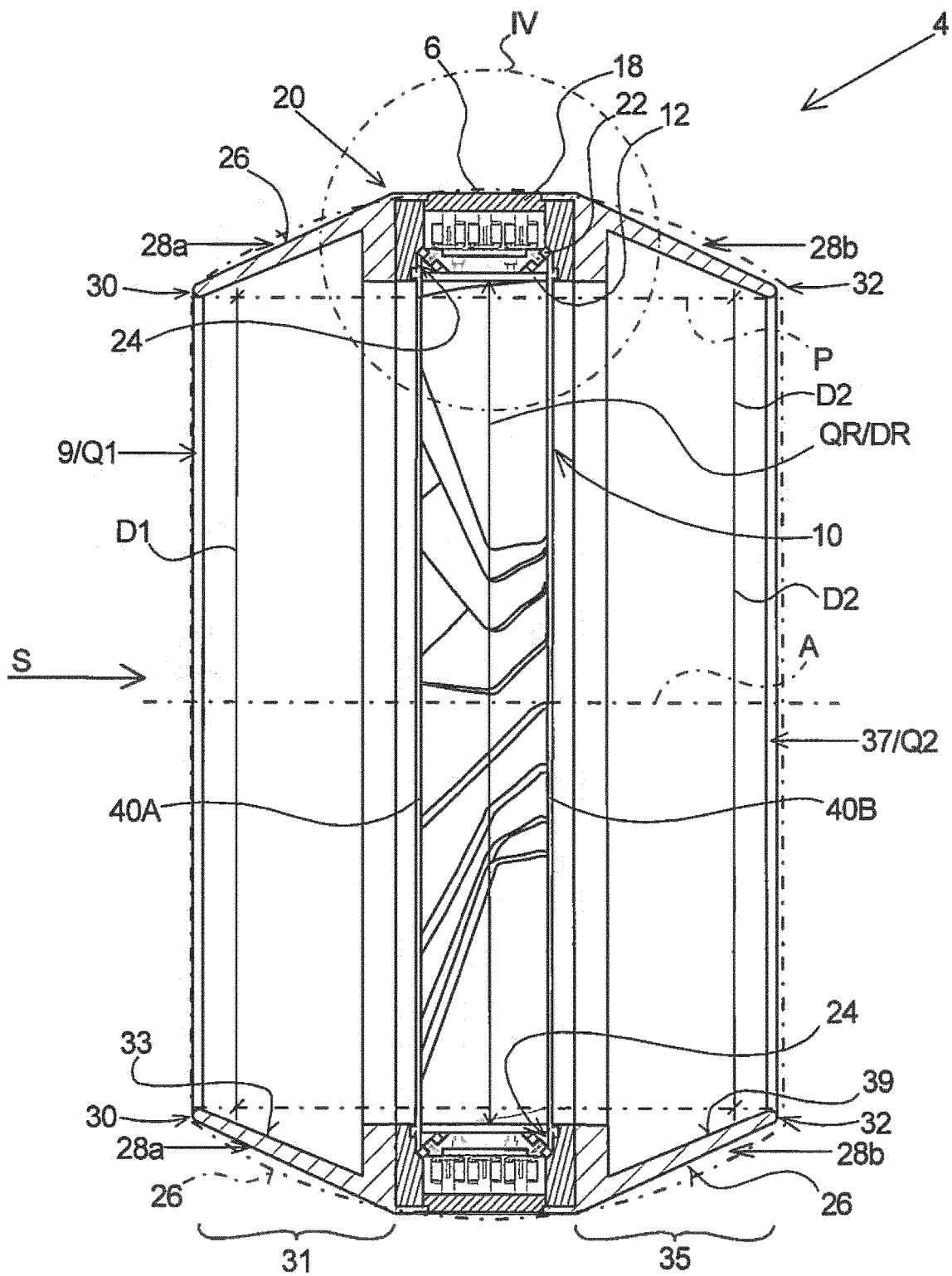
Figure 4:
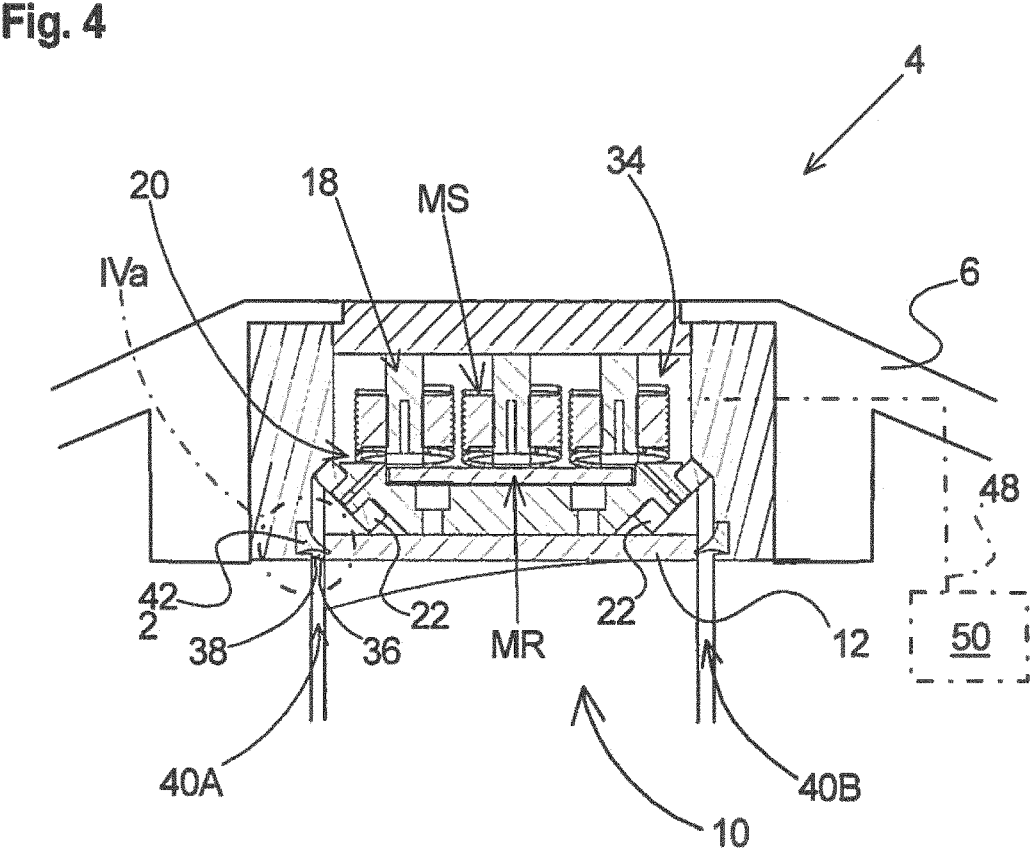
Figure 4A:
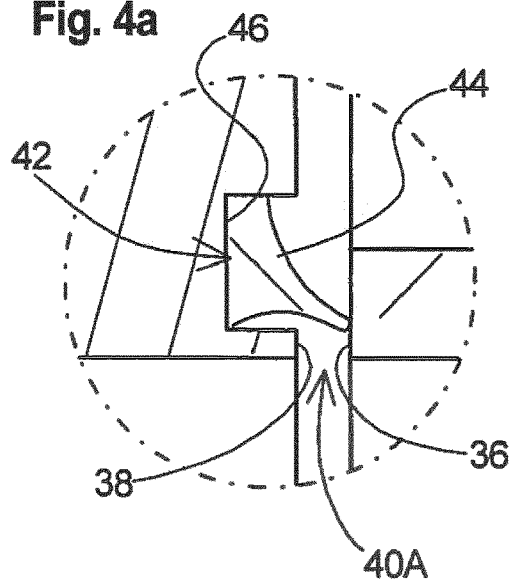
Figure 4B:
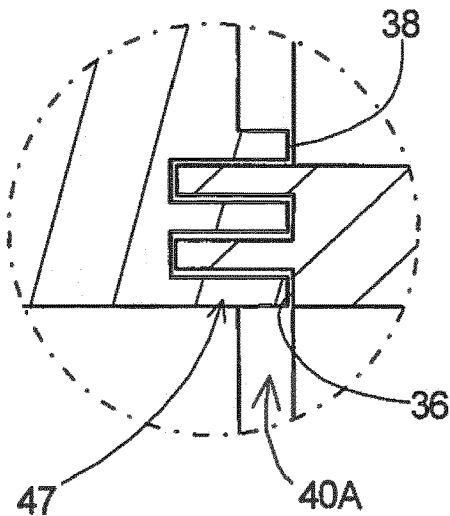
Figure 5:
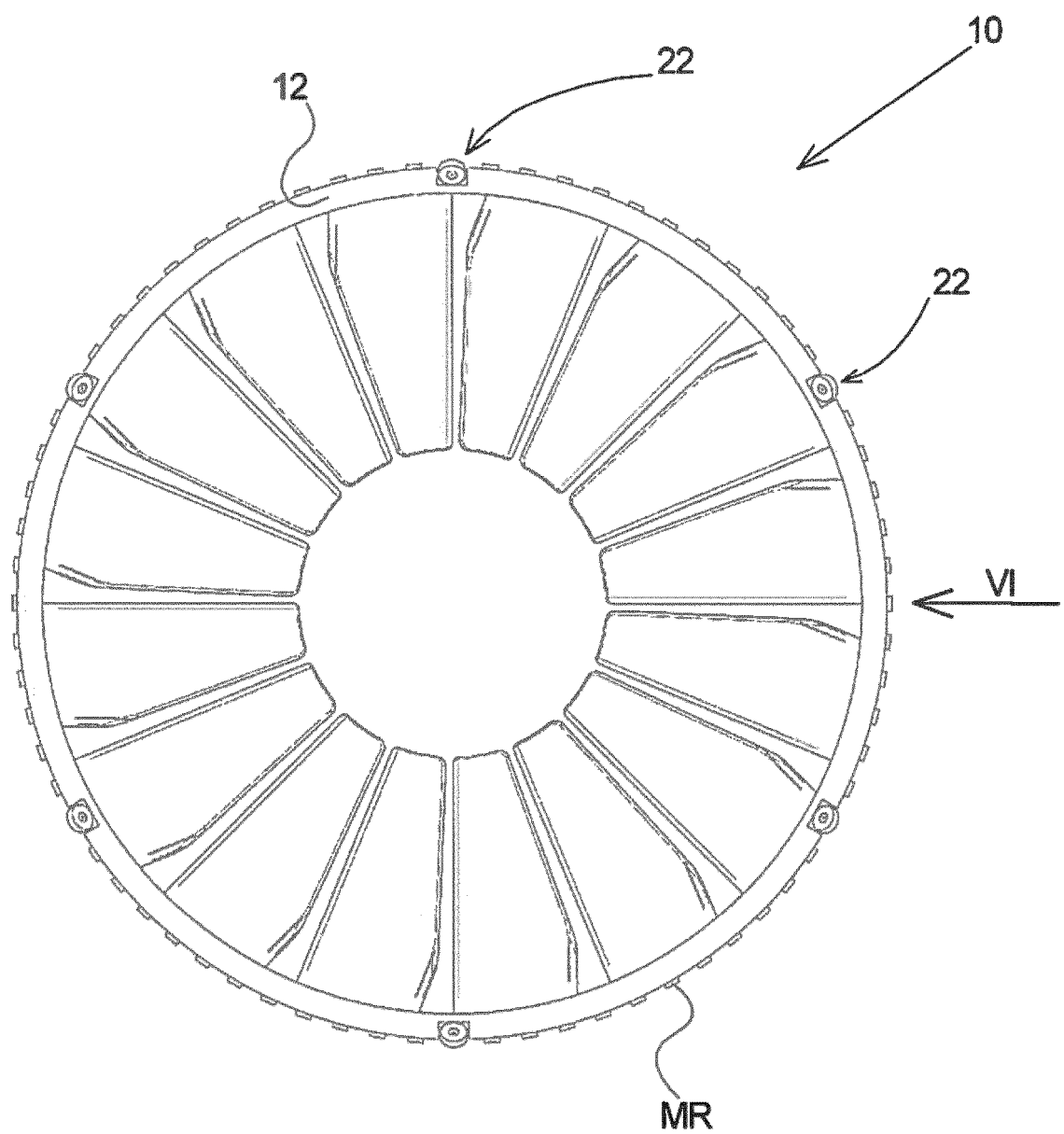
Figure 6:
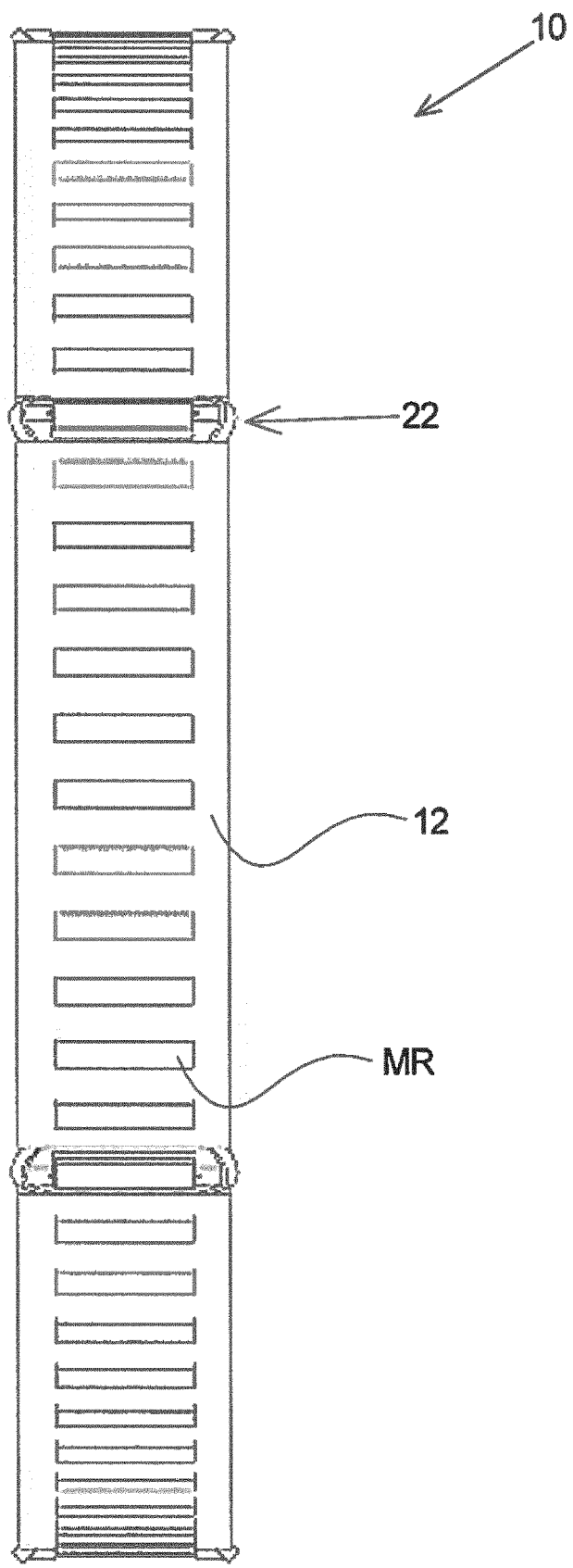
Figure 7:
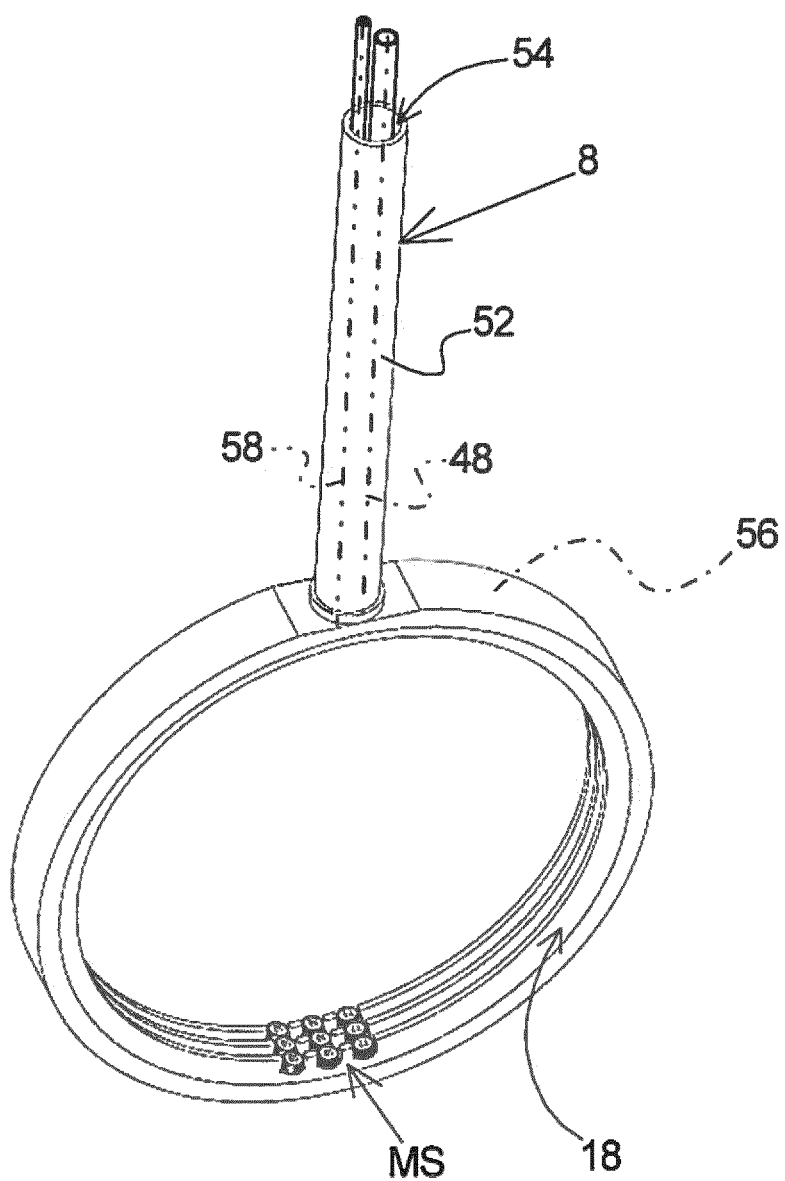
Figure 8:
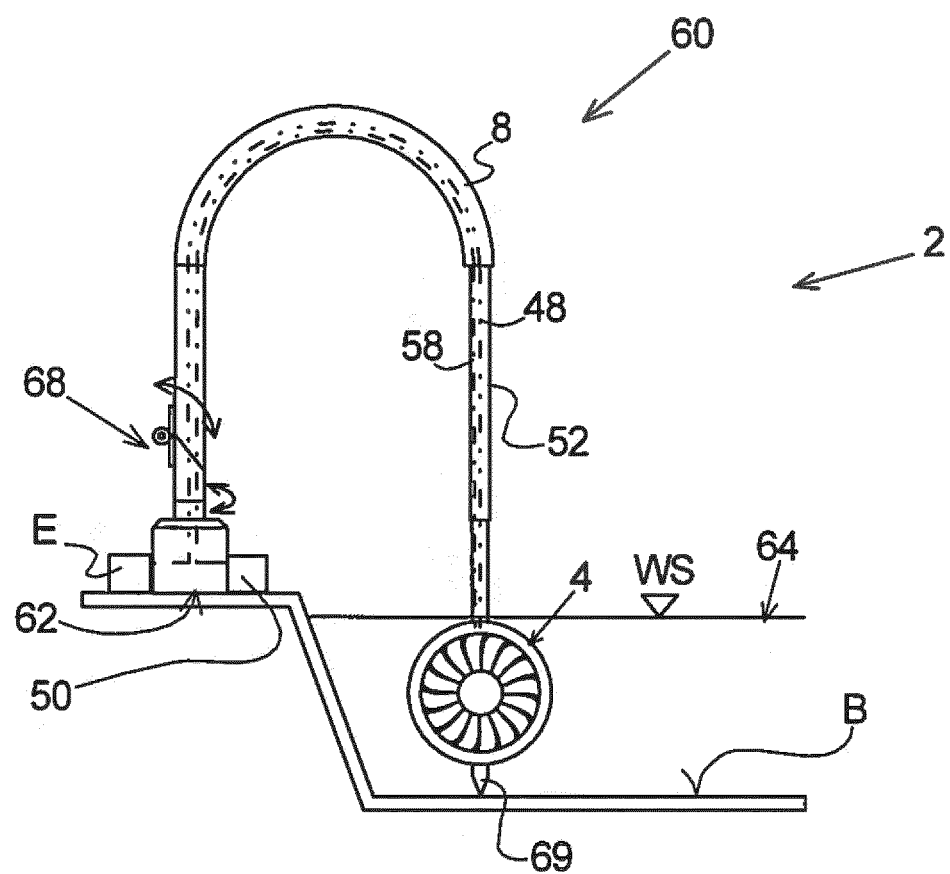
Figure 9:
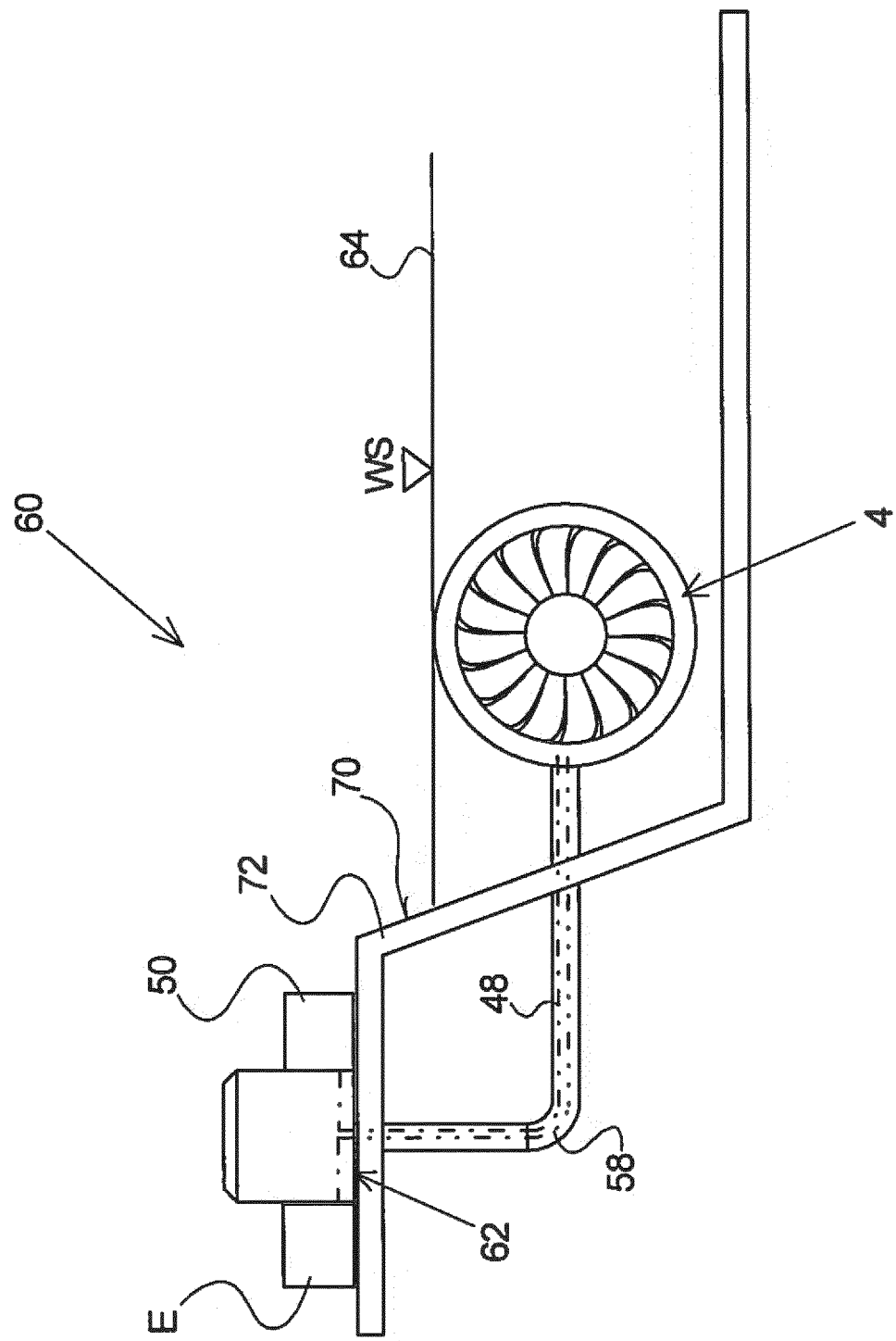
Figure 10:
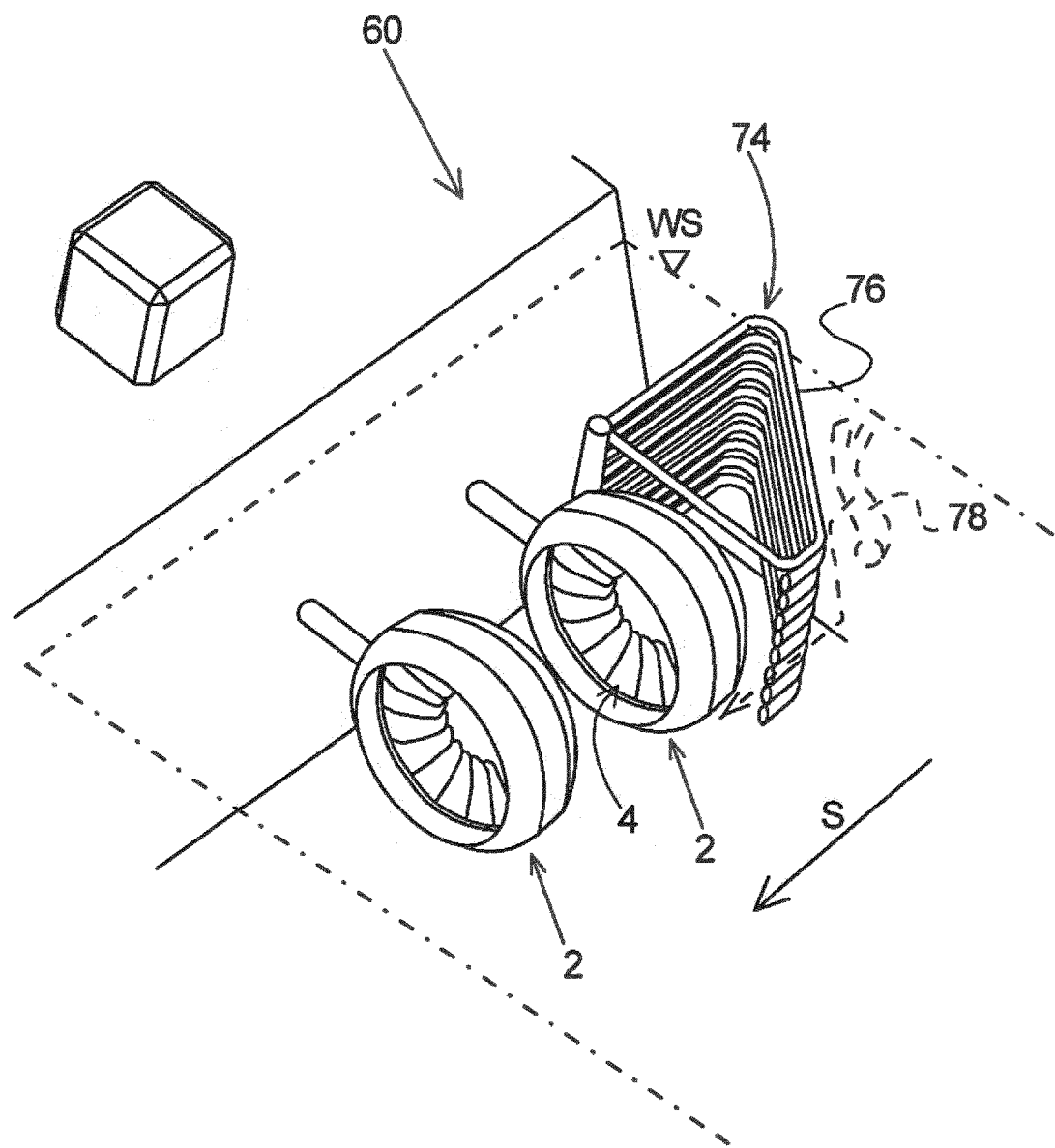

An exemplary embodiment of the invention is shown in the figures. Shown are:

FIG. 1 a perspective view of a water power plant according to the invention, FIG. 2 a view of a turbine of the water power plant in direction II of FIG. 1, FIG. 3 a sectional view of the turbine in the plane III-III of FIG. 2, FIG. 4 an enlarged detail IV of FIG. 3, FIG. 4*a* a further enlarged seal according to detail IVa of FIG. 4, FIG. 4*b* an alternative embodiment of the seal, FIG. 5 a view of a rotor of the turbine, FIG. 6 a side view of the rotor in the direction VI of FIG. 5, FIG. 7 a perspective view of a stator of the turbine, FIG. 8 a perspective view of a water power installation with the water power plant according to FIG. 1, FIG. 9 is a perspective view of an alternative embodiment of the invention water power installation with the water power plant according to FIG. 1 and FIG. 10 a perspective view of another alternative embodiment of water power installation with two water power plants according to FIG. 1 and a protective arrangement.

Figure 11:
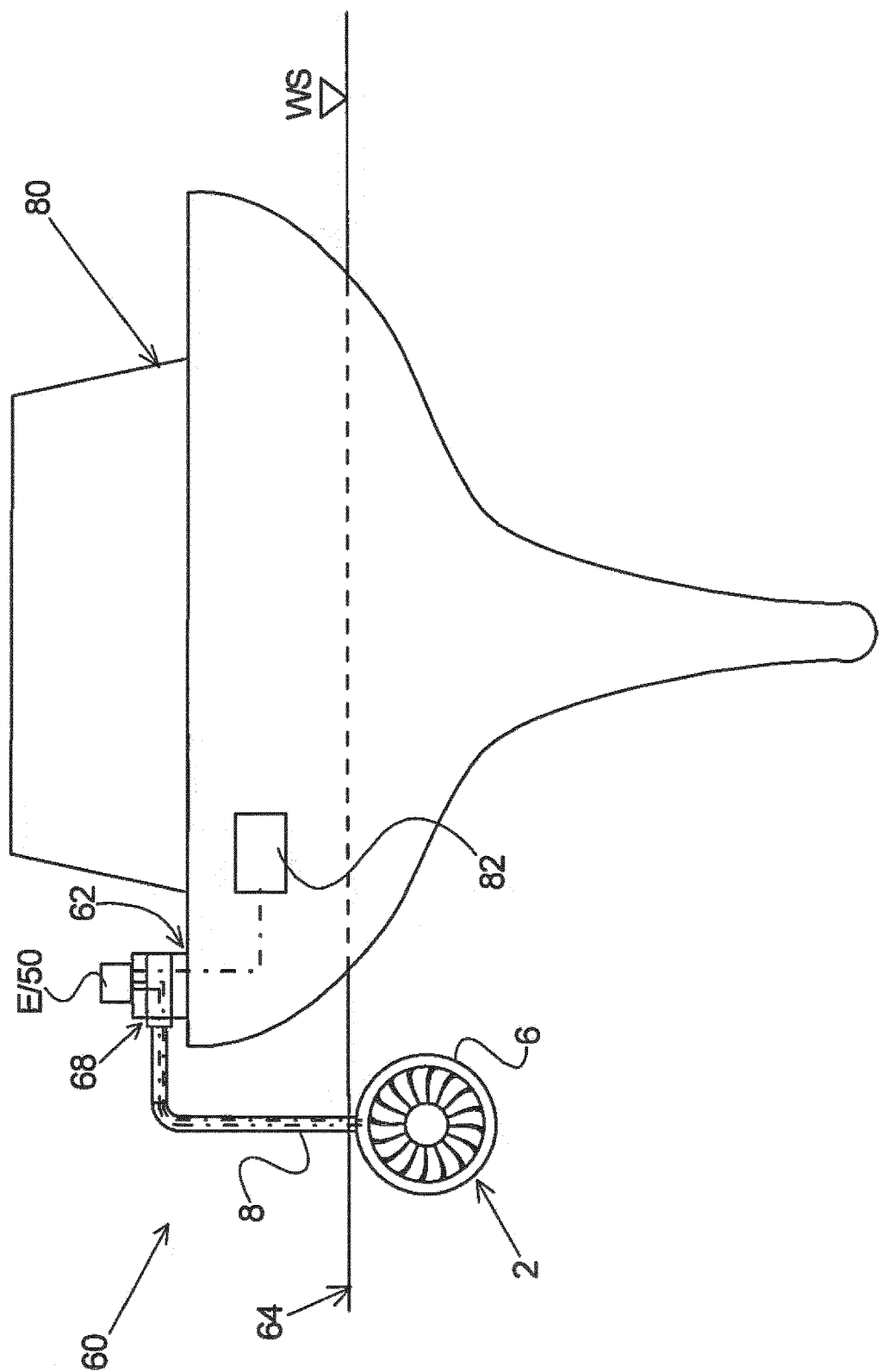

FIG. 11 a perspective view of a further alternative embodiment of the water power installation mounted on a watercraft.

FIGS. 1 and 2 show a water power plant 2 in the form of a mini power plant that features a turbine 4 with housing 6 that is held on a tubular support apparatus 8. In said case, the turbine 4 features a circular inlet opening 9 that is delimited by the housing 6 and that delimits a circular free inlet cross-section Q1 that features a diameter D1 of at least 30 cm, as can be seen in FIG. 2.

Within the housing 6, a rotor 10 of an electric generator 20 is provided. The rotor 10 features a rotor ring 12 with a cylindrical annular surface RF from which an arrangement of several turbine blades 14 projects radially inwards. The turbine blades 14 only extend so far inwardly that around a free-standing axis of rotation A defined by the rotor 10 a free passage opening 16 remains, which features a diameter DO of at least 10 cm.

As shown in FIGS. 3 and 4, the rotor 10 is rotatably mounted within an annular stator 18 that is fixedly connected to the housing 6. In said case, the rotor 10 is rotatably mounted over several rollers 22 on a stator-side inner side 24 that is formed by the stator 18 and/or the housing 6. The stator 18 and the rotor 10 thus form the electric generator 20 that is used to generate electric power from a medium flowing through the turbine 4 in the flow direction S.

The electric generator 20 of the turbine 4 operates as a low-speed rotor due to a high number of poles distributed over the circumference of the stator. In said case, the number, size, shape and angle of attack of turbine blades 14 are selected in such a way that, in the case of the applications provided for the water power plant 2, no appreciable turbulences are generated even at different flow rates.

As seen in FIG. 3, the housing 6 of the turbine 4 features a circumferential cross-section that is convexly formed on an outer side 26. As illustrated, the convex shape, for example, can be formed by two oppositely inclined face sides 28a, 28b that extend away from a first front-side cutting edge 30 and a second face side cutting edge 32.

Based on the flow direction S, the first front-side cutting edge 30 is formed on an inlet portion 31 and the second face side cutting edge 32 is formed at an outlet portion 35 of the housing 6. The first front-side cutting edge 30 delimits the circular inlet opening 9 with the free inlet cross-section Q1, and an entry-side guide surface 33 extends away from the first front-side cutting edge 30 in the direction of the rotor 10. The guide surface 33, as shown, can be designed such that it tapers towards the first front-side cutting edge 30. As an alternative to this, the guide surface 33, for example, can also be cylindrical (not shown).

The second face side cutting edge 32 of the outlet portion 35 also delimits an outlet opening 37 with a free outlet cross-section Q2 that features a diameter D2, wherein an outlet-side guide surface 39 extends away from the second face side cutting edge 32 in the direction of the rotor 10. As shown, the outlet-side guide surface 39 can also be designed such that it tapers toward the second face side cutting edge 32. As an alternative to this, however, the outlet-side guide surface 39, for example, can also be cylindrical (not shown).

In any case, the diameter D1 of the free inlet cross-section Q1 of the circular inlet opening 9 is dimensioned such that it is maximally as large as the diameter DR of the cross-sectional area QR delimited by annular area RF of the rotor ring 12. Preferably, the free inlet cross section Q1 is dimensioned in such a way that it corresponds to the resulting surface from the cross-sectional area QR of the rotor ring 12 minus a material cross-sectional area of the turbine blades 14 extending perpendicularly to the direction of flow S. In this way, only such a flow volume can flow in at the circular inlet opening 9 during operation, as can flow through the rotor 10 without substantial backwater.

Moreover, the diameter D1 of the free inlet cross-section Q1 of the circular inlet opening 9 is maximally as large as the diameter D2 of a free outlet cross-section Q2 of the outlet opening 37. In this way, a substantially backwater-free flow of a conveyed medium can be formed over an entire flow path P between the circular inlet opening 9 and the outlet opening 37, so that during the operation of the water power plant 2 an occurring backwater pressure can be reduced to a minimum.

The two cutting edges 30, 32 are preferably sharp-edged or formed with a radius as small as possible in order to be able to divide the flow body guided along the flow path P as far as possible from the rest of the medium and again converged together after passing through the water power plant 2. Preferably, the radius of the cutting edges 30, 32 is selected such that cut injuries during the assembly and in the normal use of the water power plant 2 can still be excluded, wherein the radius is at most 5 mm.

As an alternative to the illustrated cross-section of the housing 6, the housing can also be flat circumferentially on the outer side 26, in the sense of continuously smooth form. In said case, the cross-section, as shown by dashed-dotted lines, can be essentially circular in shape and axis-symmetrical. With appropriate shape and arrangement of the turbine blades 14, the turbine 4 could be operated in a directionally independent manner, i.e. from both sides. As an alternative to this, the outer side 26 could also be adapted in portions to the shape of a wing profile in order to achieve a particularly low cW value, thereby minimizing the flow resistance in a specific flow direction S or the backwater pressure on the housing 6 during operation.

As shown, particularly in FIG. 4, the turbine 4 features a coil cavity 34 that is delimited by the rotor ring 12 of the rotor 10 and the stator 18 and/or the housing 6 fixedly connected thereto. In this coil cavity 34, rotor-side magnetic-field generating means MR and stator-side magnetic-field generating means MS are arranged adjacent to each other. In the depicted embodiment of the electric generator 20, the rotor-side magnetic-field generating means MR are exemplarily formed by permanent magnets and the stator-side magnetic-field generating means MS are formed by coils.

As can be seen in FIG. 4, the two annular gaps 40A, 40B are arranged in each case between a rotor-side annular edge 36 and a stator-side annular edge 38 that can be formed both by the stator 18 and by the housing 6. Both annular gaps 40A, 40B can be sealed to the outside at least partially against the ingress of water.

In order to seal the annular gap 40A, 40B, as shown in FIGS. 4 and 4a, a lip seal 42 can be provided. As can be seen particularly from FIG. 4a, this lip seal 42, for example, can be formed by a sealing ring 44 that is held in a stator-side annular groove 46 and rests circumferentially on the rotor-side edge 36. As an alternative to this, the sealing ring 44 can also be held conversely in a rotor-side annular groove and rest on the stator-side edge 38 (not shown).

FIG. 4b shows an alternative embodiment of the seal of the coil cavity 34, in which a labyrinth seal 47 is provided on the annular gap 40. For this purpose, mutually intermeshing teeth are provided on the rotor-side edge 36 and on the stator-side edge 38.

Alternatively or additionally to the use of one of the above-mentioned seals, the coil cavity 34 according to FIG.

4b can be acted upon by compressed air source 50 via a pressure line 48 with compressed air in order to prevent water ingress into the coil cavity 34.

In addition, an anti-adhesion coating can be provided on the lip seal 42 as well as on the labyrinth seal or on the edges 36, 38 in order to ensure the smallest possible friction resistance despite the seal on the annular gap 40.

In a further embodiment, the rollers 22 can be formed by lubricant-free bearing rollers, such as, for example, plastic rollers with which sealing of the annular gaps 40A, 40B can be dispensed with.

In order to avoid damage to the magnetic field generating means MR, MS in any case of water ingress into the coil cavity 34, they can additionally feature an additional protection at least in the area of the coil cavity 34. For this purpose, the coil-shaped stator-side magnetic-field generating means MS and the rotor-side magnetic-field generating means MR, as can be seen in FIGS. 5 and 6, are formed by circumferentially arranged permanent magnets, for example, sealed with epoxy resin.

As can also be seen from FIGS. 5 and 6, the rollers 22 are arranged circumferentially on the rotor ring 12 of the rotor 10. In addition or alternatively, it would also be possible to provide the rollers 22 on the stator 18 or on the housing 6 and to support them on the rotor 10 (not shown).

FIG. 7 shows the stator 18 with only a part of the preferably completely circumferentially arranged coil-shaped stator-side magnetic field generating means MS and housing part 56 that is fixedly connected to the stator 18 or formed in one piece with it. Moreover, the supporting apparatus 8 that is essentially formed by a tubular support element 52 and it thereby forms a free mounting cross-section 54 is attached to the housing part 56.

This free mounting cross-section 54 is used to hold an electrical line 58 by leading from the stator, by means of which power generated by the turbine 4 can be transmitted away. In addition, the compressed air line 48 can also be guided to the coil cavity 34 via the mounting cross-section 54 in order to connect the latter to the compressed air source 50.

FIG. 8 shows a hydroelectric installation 60 in which the water power plant 2 is connected via the support apparatus 8 to a fixing means 62. The turbine 4 here is arranged below a water level WS of a flowing body of water 64. The fixing means 62 that can be formed, for example, by a support in the form of a foundation or by a ground anchor is arranged above the turbine 4 on an embankment. Further means for the operation of the water power plant 2, for example, the compressed air source 50 or electrical devices E, for example, a transformer or an electrical distributor, can also be provided on the fixing means 62.

In order to be able to displace the turbine 4, for example, for maintenance, repair or cleaning purposes from the flowing water 64, a rotating and/or pivoting joint 68 can be provided between the support apparatus 8 and the fixing means 62.

As depicted, for example, for the embodiment FIG. 8, a spur 69 can be provided also on the housing 6 of the turbine 4 that protrudes, in particular, from one side of the housing 6 facing away from the supporting element 52 and for additional anchoring of the water power plant 2 on the base B of the respective water body.

FIG. 9 shows an alternative embodiment of the water power plant 60 that is operated as a stationary installation. For this purpose, the support apparatus 8 is permanently installed at a water body edge 70, for example, in a bank crest.

In both embodiments according to FIGS. 8 and 9, the fixing means 62 is arranged outside the water body at a level above the turbine, for example, on a dike 72. In this way, both the fixing means 62 and the lines 48, 58 that are routed in the support apparatus, as well as the electrical devices E can be protected from ingress of water in the event of flooding.

As can be seen from FIG. 10, in a further embodiment of the water power plant 60, two or more water power plants 2 may also be provided, for example, arranged in series or alternatively in parallel or offset with respect to one another as depicted.

Moreover, as illustrated by way of example for one of the water power plants 60 according to FIG. 10, one or more water power plants 2 may also feature a protective arrangement 74 that can be perfused with the medium. This consists, for example, of an arrangement of essentially horizontally oriented rods 76 that are arranged at an angle to the direction of flow S of the flowing water 64. In this way, floating refuse or material 78, which is approaching the relevant water power plant 2, can be deflected around the turbine 4 in order to avoid damage or contamination.

The protective arrangement 74 can thereby be attached separately to the water power plant 2, arranged behind it, for example, on the waterbed or on the shore, to withstand greater forces that are exerted, for example, by colliding with floating refuse or material 78. As an alternative to this, however, the protective arrangement 74 can also be held on the housing 6 in order to enable rapid construction and easy transport of the entire water power plant 60.

As can be seen from FIG. 11, in a further embodiment of the water power installation 60, the water power plant 2 can be attached to a watercraft 80, for example, via the rotating and/or pivot joint 68. As an alternative to the illustrated lateral attachment, the water power plant 60 can be attached alternatively or additionally to a bow or stern of the watercraft 80. In any case, the hydroelectric installation 60 can be used for charging electrochemical energy storage in the form of a battery/accumulator system 82.

The invention claimed is:

1. A water power plant for the generation of electric power from a flowing medium by means of a turbine, comprising:
   a housing that the medium can flow around on an outer side;
   a stator of an electric generator that operates as a low speed rotor; and
   a rotor of the electric generator rotatably supported relative to the stator,
   wherein the rotor comprises a rotor ring with an annular surface and an assembly of turbine blades extending inwardly from the rotor ring, and thereby defines a freely standing rotation axis along a longitudinal direction of the housing,
   wherein the housing features an inlet portion with a first front-side cutting edge that delimits a circular inlet opening, from which an inlet-side guide surface extends to the rotor, and an outlet portion with an outlet opening, between which a flow path passing through the rotor ring can be formed,
   wherein an outer diameter of an outer surface of the inlet-side guide surface decreases from the rotor to the first front-side cutting edge,
   wherein the circular inlet opening is no larger than the rotor ring, and
   wherein the housing features a convex contour in the longitudinal direction between the inlet opening and the outlet opening on the outer side.

2. The water power plant according to claim 1, wherein the circular inlet opening is no larger than the cross-sectional area that is delimited by the rotor ring minus an area of the turbine blades.

3. The water power plant according to claim 1, wherein the outlet portion features a second face side cutting edge that delimits the circular outlet opening from which an outlet-side guide surface extends to the rotor, and the inlet opening is no larger than the outlet opening.

4. The water power plant according to claim 3, wherein the front-side cutting edge features a maximum radius of 5 mm.

5. The water power plant according to claim 3, wherein the rotor can be rotated in opposite directions relative to the stator in both directions of rotation, and at least the housing is formed axis-symmetrically.

6. The water power plant according to claim 3, wherein the annular surface delimits an inner flow diameter of at least 30 cm.

7. The water power plant according to claim 3, wherein a free through-opening is provided on the axis of rotation that features a diameter of at least 10 cm.

8. The water power plant according to claim 1, wherein the front-side cutting edge features a maximum radius of 5 mm.

9. The water power plant according to claim 8, wherein the rotor can be rotated in opposite directions relative to the stator in both directions of rotation, and at least the housing is formed axis-symmetrically.

10. The water power plant according to claim 8, wherein the annular surface delimits an inner flow diameter of at least 30 cm.

11. The water power plant according to claim 1, wherein the rotor can be rotated in opposite directions relative to the stator in both directions of rotation, and at least the housing is formed axis-symmetrically.

12. The water power plant according to claim 11, wherein the annular surface delimits an inner flow diameter of at least 30 cm.

13. The water power plant according to claim 1, wherein the annular surface delimits an inner flow diameter of at least 30 cm.

14. The water power plant according to claim 1, wherein a free through-opening is provided on the axis of rotation that features a diameter of at least 10 cm.

15. The water power plant according to claim 1, wherein the turbine blades project from the rotor ring into the inlet portion and into the outlet portion.

* * * * *